(12) United States Patent
Xi et al.

(10) Patent No.: US 11,754,537 B2
(45) Date of Patent: Sep. 12, 2023

(54) DEVICE FOR TESTING CONTROL OF POLYMORPHIC FOAM ON FLOWING FIRE

(71) Applicant: Tianjin University of Technology, Tianjin (CN)

(72) Inventors: Zhilin Xi, Tianjin (CN); Ze Shan, Tianjin (CN); Bangxin Jin, Tianjin (CN); Ziyao Zhang, Tianjin (CN)

(73) Assignee: TIANJIN UNIVERSITY OF TECHNOLOGY, Tianjin (CN)

( * ) Notice: Subject to any disclaimer, the term of this patent is extended or adjusted under 35 U.S.C. 154(b) by 733 days.

(21) Appl. No.: 16/923,652

(22) Filed: Jul. 8, 2020

(65) Prior Publication Data
US 2021/0208118 A1 Jul. 8, 2021

(30) Foreign Application Priority Data
Jan. 6, 2020 (CN) .......................... 202010008914.8

(51) Int. Cl.
*G01N 31/12* (2006.01)
*A62C 37/50* (2006.01)
*A62D 1/02* (2006.01)
*A62C 31/12* (2006.01)

(52) U.S. Cl.
CPC .............. *G01N 31/12* (2013.01); *A62C 31/12* (2013.01); *A62C 37/50* (2013.01)

(58) Field of Classification Search
USPC ....................................................... 73/60.11
See application file for complete search history.

(56) References Cited

U.S. PATENT DOCUMENTS

| 4,983,124 A * | 1/1991 | Ernst ...................... G09B 19/00 434/226 |
| 5,425,885 A * | 6/1995 | Zhao .................... A62D 1/0035 252/607 |
| 7,080,694 B2 * | 7/2006 | Boyle .................... A62C 37/50 169/44 |
| 7,513,315 B2 * | 4/2009 | Boyle .................... A62C 37/50 169/43 |
| 11,020,624 B2 * | 6/2021 | Williamson ............. G09B 9/00 |
| 2013/0199805 A1 * | 8/2013 | Gaskill .................... A62C 8/00 169/46 |

FOREIGN PATENT DOCUMENTS

CN       210384676 U    *    4/2020

* cited by examiner

*Primary Examiner* — Clayton E. LaBalle
*Assistant Examiner* — Warren K Fenwick
(74) *Attorney, Agent, or Firm* — Tutunjian & Bitetto, P.C.

(57) ABSTRACT

The present invention discloses a device for testing control of polymorphic foam on flowing fire, comprising a test bench, a combustible liquid injecting mechanism and a polymorphic foam spraying mechanism. The combustible liquid injecting mechanism and the polymorphic foam spraying mechanism are relatively arranged on the test bench. The combustible liquid injecting mechanism can spray combustible liquid to the test bench. The polymorphic foam spraying mechanism can spray polymorphic foam to the test bench, and the spraying direction of the polymorphic foam is relative to the spraying direction of the combustible liquid. The present invention can be used for testing and observing cut-off and control effects of polymorphic foam on combustible liquid flowing fire.

8 Claims, 3 Drawing Sheets

This page is illegible.

DEVICE FOR TESTING CONTROL OF POLYMORPHIC FOAM ON FLOWING FIRE

TECHNICAL FIELD

The present invention relates to the technical field of fire fighting equipment, and in particular to a device for testing control of polymorphic foam on flowing fire.

BACKGROUND

In China, the petrochemical industry is very important and the chemical industry has a history of nearly a hundred years. Rapid development of the petrochemical industry inevitably causes large increase of storage and transportation amount of combustible liquid. Once generating leakage, the combustible liquid is very easy to cause fire hazards. If a single oil tank generates leakage, fire or explosion accidents, flowing fire may diffuse to cause linked disasters in one area so as to not only seriously threaten the safety of people and facilities, but also cause secondary disasters such as large-area environmental pollution and the like. However, the existing fire technology has a technical problem that combustible liquid flowing fire cannot be highly efficiently prevented and controlled. Therefore, how to effectively prevent and extinguish the combustible liquid flowing fire has become a serious problem urgent to be solved.

For this reason, a person of skill in the art provides a polymorphic foam fire-fighting technology. In such technology, polymorphic foam is prepared by a foaming agent and organic acid, wherein the foaming agent is formed by a surfactant, an alkalescent aqueous solution and a few thermoplastic powders. The foaming agent has the characteristic and advantage of quick solidification when extinguishing the combustible liquid flowing fire. However, it is unknown whether the polymorphic foam can effectively prevent and extinguish the combustible liquid flowing fire. Therefore, to determine the control effect of the polymorphic foam on the flowing fire, it is necessary to research a device for testing control of polymorphic foam on flowing fire.

SUMMARY

An objective of the present invention is to provide a device for testing control of polymorphic foam on flowing fire to solve problems in the prior art as well as to test and observe cut-off and control effects of polymorphic foam on combustible liquid flowing fire.

To achieve the above objective, the present invention provides the following solution.

The present invention provides a device for testing control of polymorphic foam on flowing fire, comprising a test bench, a combustible liquid injecting mechanism and a polymorphic foam spraying mechanism. The combustible liquid injecting mechanism and the polymorphic foam spraying mechanism are relatively arranged on the test bench. The combustible liquid injecting mechanism can spray combustible liquid to the test bench. The polymorphic foam spraying mechanism can spray polymorphic foam to the test bench, and the spraying direction of the polymorphic foam is relative to the spraying direction of the combustible liquid.

Preferably, the longitudinal section of the test bench is preferably U-shaped. The test bench comprises a left wing panel, a base plate and a right wing panel, which are sequentially and fixedly connected. A plurality of adjusting rods are fixedly connected with one end of the base plate. A plurality of adjusting holes are opened in each adjusting rod in a vertical direction at equal intervals. The base plate is fixed to the adjusting rods after fixing bolts pass through the adjusting holes.

Preferably, a plurality of drainage outlets are opened in the base plate and are located at one end, away from the adjusting rods, of the base plate.

Preferably, the combustible liquid injecting mechanism comprises a combustible liquid delivery pipe, combustible liquid nozzles and a combustible liquid supply device. The combustible liquid delivery pipe is horizontally fixed to the right wing panel. A plurality of combustible liquid nozzles are opened in one side of the combustible liquid delivery pipe at equal intervals, and one end of the combustible liquid delivery pipe is communicated with the combustible liquid supply device.

Preferably, the combustible liquid supply device comprises a submersible pump and a liquid storage tank. The submersible pump is arranged in the liquid storage tank. The submersible pump is communicated with the combustible liquid delivery pipe through a quick connector. A first valve is arranged on the combustible liquid delivery pipe.

Preferably, the polymorphic foam spraying mechanism comprises a polymorphic foam delivery pipe, polymorphic foam nozzles and a polymorphic foam supply hose. The polymorphic foam delivery pipe and the combustible liquid delivery pipe are parallel. A plurality of polymorphic foam nozzles are opened in one side of the polymorphic foam delivery pipe at equal intervals. The polymorphic foam nozzles and the combustible liquid nozzles are arranged oppositely. The polymorphic foam supply hose is communicated with the polymorphic foam delivery pipe through a quick connector. A second valve is arranged on the polymorphic foam delivery pipe.

Preferably, two ends of the polymorphic foam delivery pipe are respectively and fixedly connected with a first fixing rod, and the first fixing rods are vertically fixed to the base plate.

Preferably, the device for testing control of polymorphic foam on flowing fire further comprises a water-based foam delivery pipe, water-based foam nozzles and a water-based foam supply hose. Two ends of the water-based foam delivery pipe are fixed to the test bench by respectively utilizing a second fixing rod. The water-based foam delivery pipe and the combustible liquid delivery pipe are mutually vertical. A plurality of the water-based foam nozzles are opened in the water-based foam delivery pipe at equal intervals. The water-based foam supply hose is communicated with the water-based foam delivery pipe through a quick connector. A third valve is arranged on the water-based foam delivery pipe.

The present invention achieves the following technical effects compared with the prior art:

The present invention arranges the combustible liquid injecting mechanism and the polymorphic foam spraying mechanism on the test bench, utilizes the combustible liquid injecting mechanism to spray the combustible liquid to the test bench, simultaneously utilizes the polymorphic foam spraying mechanism to spray the polymorphic foam to the test bench, and also ensures relative spraying of the combustible liquid and the polymorphic foam so as to observe and test cut-off and control effects of the polymorphic foam on the combustible liquid flowing fire.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Wherein: 1—test bench, 101—base plate, 102—left wing panel, 103—right wing panel, 2—drainage outlets, 3—second fixing rod, 4—polymorphic foam delivery pipe, 5—polymorphic foam nozzle, 6—first fixing rod, 7—adjusting rod, 8—second valve, 9—polymorphic foam supply hose, 10—third valve, 11—water-based foam delivery pipe, 12—water-based foam nozzle, 13—water-based foam supply hose, 14—liquid storage tank, 15—submersible pump, 16—first valve, 17—combustible liquid delivery pipe, 18—combustible liquid nozzle, 19—fixing bolt.

DESCRIPTION OF THE EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the foregoing objective, features, and advantages of the present invention more apparent and more comprehensible, the present invention is further described in detail below with reference to the accompanying drawings and specific embodiments.

Figure 1:
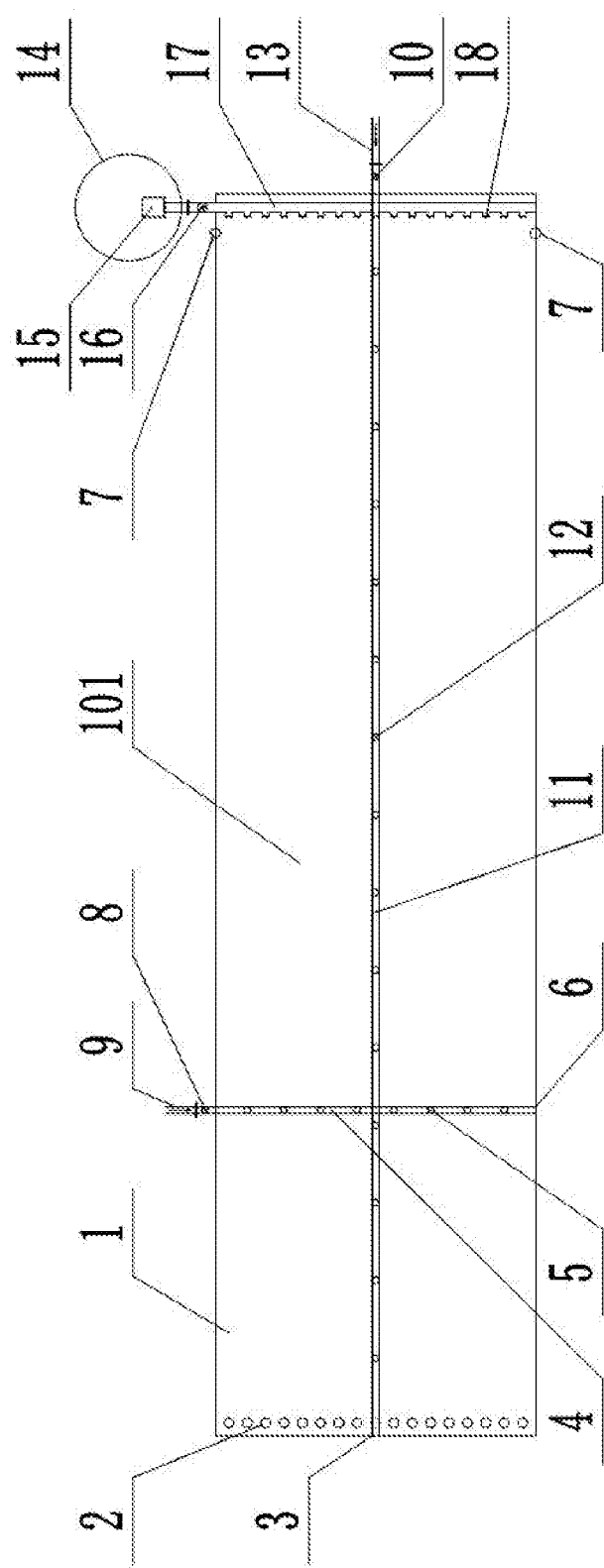
FIG. 1 is a top view of a device for testing control of polymorphic foam on flowing fire of the present invention.
Figure 2:
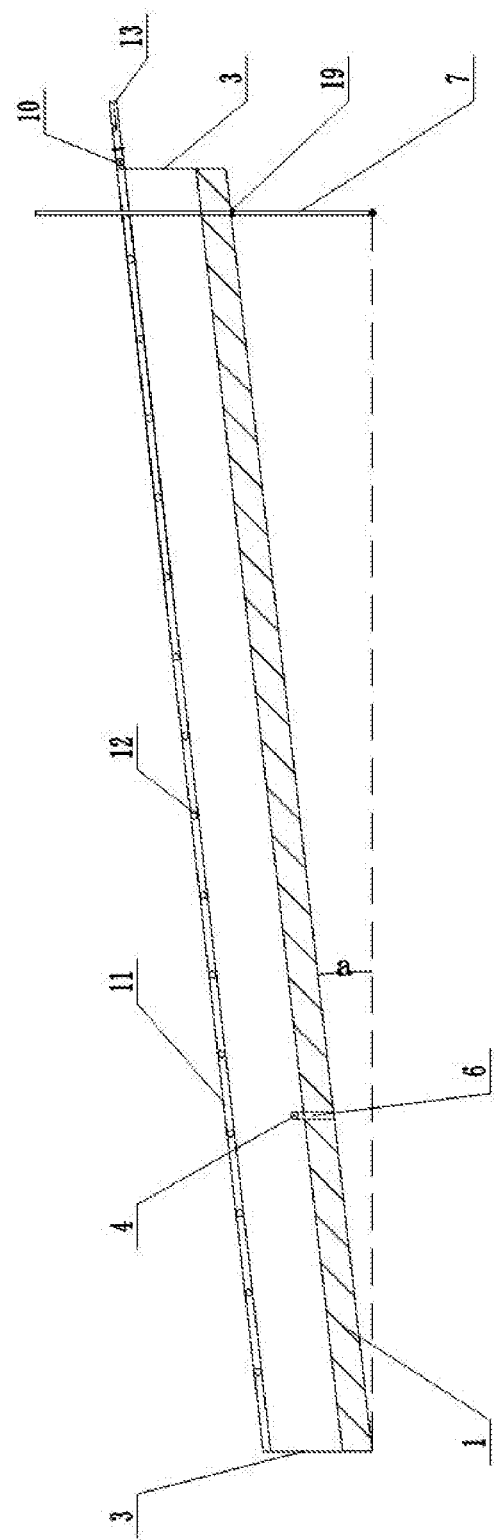
FIG. 2 is a front view of a device for testing control of polymorphic foam on flowing fire of the present invention.
Figure 3:
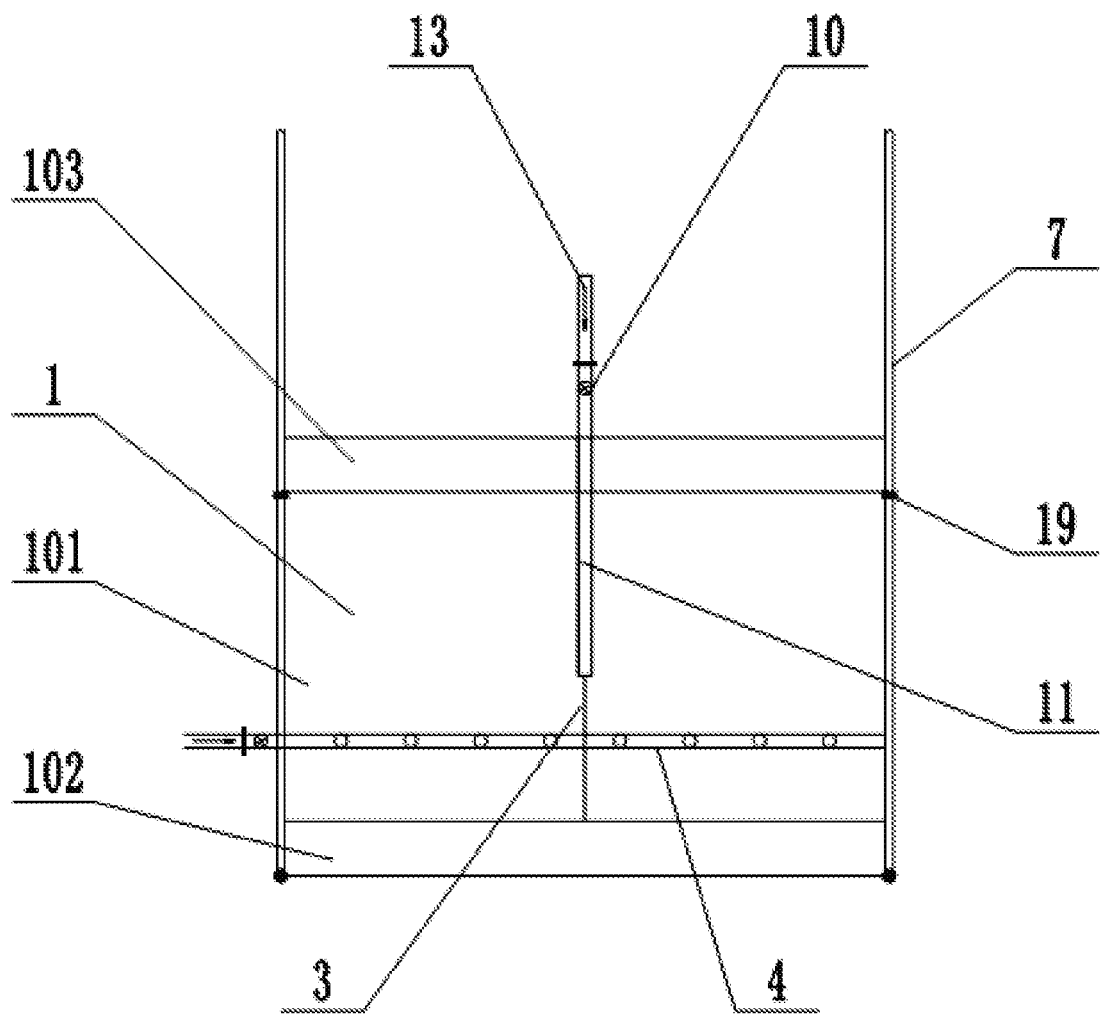
FIG. 3 is a left view of a device for testing control of polymorphic foam on flowing fire of the present invention.

As shown in FIG. 1 to FIG. 3, the embodiment provides a device for testing control of polymorphic foam on flowing fire, comprising a test bench 1, a combustible liquid injecting mechanism and a polymorphic foam spraying mechanism. The combustible liquid injecting mechanism and the polymorphic foam spraying mechanism are relatively arranged on the test bench 1. The combustible liquid injecting mechanism can spray combustible liquid to the test bench 1. The polymorphic foam spraying mechanism can spray polymorphic foam to the test bench 1, and the spraying direction of the polymorphic foam is relative to the spraying direction of the combustible liquid.

In the embodiment, the longitudinal section of the test bench 1 is preferably U-shaped. The test bench 1 comprises a left wing panel 102, a base plate 101 and a right wing panel 103, which are sequentially and fixedly connected. A plurality of adjusting rods 7 are fixedly connected with one end of the base plate 101. A plurality of adjusting holes are opened in each adjusting rod 7 in a vertical direction at equal intervals. The base plate 101 is fixed to the adjusting rods 7 after fixing bolts 19 pass through the adjusting holes. The adjusting rod 7 may be used for adjusting a test angle of the test bench 1 through the fixing bolt 19. Additionally, the adjusting rod 7 may also be provided with the existing telescopic rod, the base plate 101 is fixed to a support rod of the telescopic rod, and the support rod telescopes in a main rod so as to adjust an inclination angle α (preferably, $0°≤α<90°$), namely the test angle, of the test bench 1. Specifically, the flow rate of the liquid on the test bench 1 can be adjusted by adjusting the inclination angle α of the test bench 1, even can be calculated according to the physical property of the fluid and the inclination angle of the test bench 1. A plurality of drainage outlets 2 are opened in the base plate 101. The drainage outlets 2 are located on one side close to the left wing panel 102, namely at one end, away from the adjusting rods 7, of the base plate 101. After a test is completed, liquid can be drained through the drainage outlets 2.

Specifically, the combustible liquid injecting mechanism comprises a combustible liquid delivery pipe 17, combustible liquid nozzles 18 and a combustible liquid supply device, the combustible liquid delivery pipe 17 is horizontally fixed to the right wing panel 103, a plurality of combustible liquid nozzles 18 are opened in one side of the combustible liquid delivery pipe 17 at equal intervals, and one end of the combustible liquid delivery pipe 17 is communicated with the combustible liquid supply device. The combustible liquid supply device comprises a submersible pump 15 and a liquid storage tank 14. The submersible pump 15 is arranged in the liquid storage tank 14. The submersible pump 15 is communicated with the combustible liquid delivery pipe 17 through a quick connector. A first valve 16 is arranged on the combustible liquid delivery pipe 17.

Specifically, the polymorphic foam spraying mechanism comprises a polymorphic foam delivery pipe 4, polymorphic foam nozzles 5 and a polymorphic foam supply hose 9. The polymorphic foam delivery pipe 4 and the combustible liquid delivery pipe 17 are parallel. Two ends of the polymorphic foam delivery pipe 4 are respectively and fixedly connected with a first fixing rod 6, and the first fixing rods 6 are vertically fixed to the base plate 101. In one example, the first fixing rod 6 is located at the position of ⅓ or ⅔ the length of the base plate 101 corresponding to one end, at which the combustible liquid delivery pipe 17 is arranged, of the base plate 101; moreover, the position of the first fixing rod 6 is not limited to this and can be adjusted according to actual needs. A plurality of polymorphic foam nozzles 5 are opened in one side of the polymorphic foam delivery pipe 4 at equal intervals. The polymorphic foam nozzles 5 and the combustible liquid nozzles 18 are arranged relatively. The polymorphic foam supply hose 9 is communicated with the polymorphic foam delivery pipe 4 through a quick connector. A second valve 8 is arranged on the polymorphic foam delivery pipe 4.

In the embodiment, the device for testing control of polymorphic foam on flowing fire further comprises a water-based foam delivery pipe 11, water-based foam nozzles 12 and a water-based foam supply hose 13. Two ends of the water-based foam delivery pipe 11 are fixed to the test bench 1 by respectively utilizing a second fixing rod 3. The water-based foam delivery pipe 11 and the combustible liquid delivery pipe 17 are mutually vertical and are parallel with the base plate 101 of the test bench 1. In one example, the height of the water-based foam delivery pipe 11 from the base plate 101 is a half of the width of the base plate 101. The position of the water-based foam delivery pipe 11 is at the middle portion in the width direction of the base plate 101, which is not limited to this and can be adjusted according to actual needs. A plurality of the water-based foam nozzles 12 are opened in the water-based foam delivery pipe 11 at equal intervals. The water-based foam supply hose 13 is communicated with the water-based foam delivery pipe 11 through a quick connector. A third valve 10 is arranged on the water-based foam delivery pipe 11.

During application, firstly combustible liquid is pumped out of the liquid storage tank 14 by the submersible pump 15 and then sequentially passes through the first valve 16, the combustible liquid delivery pipe 17 and combustible liquid nozzles 18 to be injected to the test bench 1. Specifically, the flow rate of the combustible liquid can be controlled by adjusting the inclination angle of the test bench 1 or the opening degree of the first valve 16. Secondly, polymorphic foam is sprayed to the test bench 1 through the polymorphic foam supply hose 9, the second valve 8, the polymorphic foam delivery pipe 4 and the polymorphic foam nozzles 5, observing whether the polymorphic foam can cut off the combustible liquid. Therefore, based on the test, the cut-off effects of different polymorphic foams can be obtained, and the proportional relationship between the spraying speed of the polymorphic foam and the flow rate of the combustible liquid at the best cut-off state can also be obtained. In the embodiment, the cut off means: the polymorphic foam can form a foam sieve to adsorb the combustible liquid in the foam so as to cut off the flowing of the combustible liquid and prevent gradually extinguished flowing fire from diffusing and firing, thereby further preventing expansion of the fire. During the whole test, the combustible liquid may be burnt or unburnt. If the combustible liquid is burnt during the test, the water-based foam can be sprayed out to extinguish the burning combustible liquid after the test is completed. If the combustible liquid is unburnt during the test, the liquid can be drained from the drainage outlets 2 after the test is completed.

Several examples are used for illustration of the principles and implementation methods of the specification. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A device for testing control of polymorphic foam on flowing fire, comprising:
   a test bench having two ends;
   a combustible liquid injecting mechanism positioned at one end of the test bench and configured to spray combustible liquid onto the test bench; and
   a polymorphic foam spraying mechanism positioned away from the combustible liquid injecting mechanism and being configured to spray polymorphic foam in a direction toward the sprayed combustible liquid.

2. The device for testing control of polymorphic foam on flowing fire according to claim 1, wherein the test bench further comprises:
   a longitudinal section of the test bench is U-shaped;
   a left wing panel, an inclinable base plate and a right wing panel, which are sequentially and fixedly connected;
   a plurality of adjusting rods are fixedly connected with one end of the inclinable base plate and each adjusting rod having a plurality of adjusting holes in a vertical direction at equal intervals; and
   the inclinable base plate being fixed to the adjusting rods after fixing bolts pass through the adjusting holes so that the one end of the inclinable base plate is able to adjusted in height relative to an another end thereof.

3. The device for testing control of polymorphic foam on flowing fire according to claim 2, wherein the base plate further comprises a plurality of drainage outlets located at one end away from the adjusting rods, of the base plate.

4. The device for testing control of polymorphic foam on flowing fire according to claim 2, wherein the combustible liquid injecting mechanism comprises:
   a combustible liquid delivery pipe horizontally fixed to the right wing panel;
   a plurality of combustible liquid nozzles formed in one side of the combustible liquid delivery pipe at equal intervals; and
   a combustible liquid supply device in communication with the combustible liquid supply device.

5. The device for testing control of polymorphic foam on flowing fire according to claim 4, wherein the combustible liquid supply device comprises
   a submersible pump in communication with the combustible liquid delivery pipe through a quick connector, the combustible liquid delivery pipe having a first valve arranged thereon; and
   a liquid storage tank, the submersible pump being arranged in the liquid storage tank.

6. The device for testing control of polymorphic foam on flowing fire according to claim 4, wherein the polymorphic foam spraying mechanism comprises
   a polymorphic foam delivery pipe positioned in parallel with the combustible liquid delivery pipe, the polymorphic foam delivery pipe having a second valve arranged thereon;
   a plurality of polymorphic foam nozzles formed in one side of the polymorphic foam delivery pipe at equal intervals such that the polymorphic foam nozzles are arranged opposite the combustible liquid nozzles; and
   a polymorphic foam supply hose in communication with the polymorphic foam delivery pipe through a quick connector.

7. The device for testing control of polymorphic foam on flowing fire according to claim 6, wherein two ends of the polymorphic foam delivery pipe are respectively and fixedly connected with a first fixing rod, and the first fixing rods are vertically fixed to the base plate.

8. The device for testing control of polymorphic foam on flowing fire according to claim 4, wherein the device for testing control of polymorphic foam on flowing fire further comprises:
   a water-based foam delivery pipe having two ends fixed to the test bench by second fixing rods, respectively, the water-based foam delivery pipe having a third valve arranged thereon and being mutually vertical with the combustible liquid pipe;
   a plurality of water-based foam nozzles formed in the water-based foam delivery pipe at equal intervals; and
   a water-based foam supply hose in communication with the water-based foam delivery pipe through a quick connector; a third valve is arranged on the water-based foam delivery pipe.

* * * * *